US012729585B2

(12) United States Patent
La Valle et al.

(10) Patent No.: US 12,729,585 B2
(45) Date of Patent: Sep. 8, 2026

(54) LADDER STABILITY ANCHOR

(71) Applicant: Werner Co., Greenville, PA (US)

(72) Inventors: Milbert La Valle, Taguig City (PH); Ivan D. Lopez, Hermitage, PA (US)

(73) Assignee: WERNER CO., Itasca, IL (US)

( * ) Notice: Subject to any disclaimer, the term of this patent is extended or adjusted under 35 U.S.C. 154(b) by 672 days.

(21) Appl. No.: 18/140,997

(22) Filed: Apr. 28, 2023

(65) Prior Publication Data

US 2024/0360723 A1 Oct. 31, 2024

(51) Int. Cl.
*E06C 7/48* (2006.01)

(52) U.S. Cl.
CPC .................................... *E06C 7/48* (2013.01)

(58) Field of Classification Search
CPC ... E06C 7/48; E06C 7/50; E06C 7/505; B25B 7/12; B25B 5/02; B25B 5/102; B25B 5/068; B25B 5/085; B25B 5/101; F16B 2/18; F16B 2/185; F16B 2/12; F16B 37/045; F16M 11/041
USPC .......................... 182/107; 269/134, 136, 138
See application file for complete search history.

(56) References Cited

U.S. PATENT DOCUMENTS 337,825 A * 3/1886 Ervin ........................ E04G 3/26 248/237
558,544 A * 4/1896 Wojan ................. F16K 31/5284 251/234
713,038 A * 11/1902 Zimerman .............. B25B 5/102 269/147
722,677 A * 3/1903 Crippen et al. ......... B25B 5/101 269/221
769,476 A * 9/1904 Getman .................... B25B 7/12 254/133 R
792,758 A * 6/1905 Colt ........................ B25B 5/102 269/171.5
819,887 A * 5/1906 Jones ...................... B25B 5/102 269/236
833,670 A * 10/1906 Broadbooks .............. B25B 1/08 269/238
1,279,011 A * 9/1918 Sanford .................. B25B 5/101 269/244
1,297,539 A * 3/1919 Bull ........................ B25B 5/101 269/165

(Continued)

OTHER PUBLICATIONS

Guardian Fall Protection; Ladder Stability Device (Accessed Mar. 6, 2023 (https://s3-us-west2.amazonaws.com/catsy.672/85094_Rev._ B__10808_Ladder_Stability_Anchor_small.pdf).

*Primary Examiner* — Colleen M Chavchavadze
*Assistant Examiner* — Shiref M Mekhaeil
(74) *Attorney, Agent, or Firm* — Michael, Best & Friedrich LLP

(57) ABSTRACT

An anchor device includes a main body having a base with a first end and a second end, a fixed clamping bracket at one end of the base and an elongated opening or track extending along the base. A moving clamping assembly includes a moving clamping bracket and a cam lever or actuator, and the moving clamping assembly is configured to slide along the track to adjust a position of the moving clamping bracket relative to the fixed clamping bracket. Pivoting the lever tightens the moving clamping bracket against the object and locks the moving clamping assembly in position for a firm clamping hold. The anchor device may also include a tether assembly for being tethered to a ladder.

13 Claims, 13 Drawing Sheets

(56) References Cited

U.S. PATENT DOCUMENTS 1,321,627 A * 11/1919 Hagstrom ............... B25B 5/102 269/236
1,402,893 A * 1/1922 Sahlin ....................... B25B 1/10 269/200
1,474,438 A * 11/1923 Muller ................... B23Q 16/04 188/68
1,662,757 A * 3/1928 Newton ................ E04G 13/025 269/236
1,707,894 A * 4/1929 Bergesen, Sr. ............ E04G 3/18 182/60
1,985,383 A * 12/1934 Seninger ................. E04G 25/02 248/351
2,226,914 A * 12/1940 Hugh ...................... F16L 23/06 285/420
2,552,738 A * 5/1951 Renner ..................... B25B 1/12 269/212
2,762,605 A * 9/1956 Holmboe, Sr. ....... E21D 15/581 248/354.1
3,027,581 A * 4/1962 Holt .................... A47L 11/4072 15/49.1
3,084,964 A * 4/1963 Byron ....................... E04G 7/02 248/230.2
3,175,797 A * 3/1965 Wells .................. E04G 17/0754 249/188
3,856,292 A * 12/1974 Merola .................. B23Q 7/043 269/275
4,054,259 A * 10/1977 Johnson .................. E04G 17/02 249/46
4,058,282 A * 11/1977 Wahls .................... B60N 2/143 248/418
4,251,065 A * 2/1981 McDougal ............ B25B 1/2489 269/25
D261,609 S * 11/1981 Roux ............................... D8/74
4,378,624 A * 4/1983 Klingenberg ...... A61B 17/3217 29/239
4,589,640 A * 5/1986 Pert ......................... F16B 2/065 269/251
4,736,935 A * 4/1988 Vasapolli .................. B25B 1/08 269/282
4,795,141 A * 1/1989 Mulvaney ................. B25B 5/08 269/236
RE32,884 E * 3/1989 Kluting .................. B60N 2/433 297/367 R
4,877,169 A * 10/1989 Grim ....................... B60R 9/058 224/322
4,921,506 A * 5/1990 Poulton ..................... B42F 9/00 24/67.1
5,056,766 A * 10/1991 Engibarov ................ B25B 5/08 269/157
5,060,755 A * 10/1991 Bourdages ................ E06C 7/16 248/238
5,078,231 A * 1/1992 Davis ........................ E06C 7/42 D25/68
5,083,759 A * 1/1992 Pollak ..................... B25B 5/103 269/134
5,234,206 A * 8/1993 Shih ........................ B25B 5/068 269/236
5,324,013 A * 6/1994 Marino ..................... B25B 1/12 269/137
5,348,276 A * 9/1994 Blacker ................... B25B 5/085 269/169
5,364,084 A * 11/1994 Karash ...................... B25B 5/08 269/236
5,788,198 A * 8/1998 Sharpe ...................... E06C 7/16 248/210
5,946,797 A * 9/1999 Kawabe .................. G01M 1/28 29/894.3
6,027,106 A * 2/2000 Ray ........................... B25B 5/08 269/236
6,092,797 A * 7/2000 You ....................... B25B 1/2484 269/900
6,672,494 B1 * 1/2004 Fernandez ................ E06C 7/00 224/268
7,658,353 B2 * 2/2010 Ford ......................... E06B 9/02 248/229.11
9,204,774 B1 * 12/2015 Jackson .................. A47L 9/242
9,393,656 B1 * 7/2016 Weber .................... B23Q 3/103
9,598,903 B2 * 3/2017 Miller ....................... E06C 7/14
9,924,754 B1 * 3/2018 Soto .......................... F16B 2/08
10,024,632 B1 * 7/2018 Oglesby ................ F41G 11/003
10,253,926 B1 * 4/2019 Fan ....................... F21V 21/096
10,302,249 B1 * 5/2019 Kelly ....................... B25H 1/04
10,556,326 B1 * 2/2020 Kelly ........................ B25B 5/02
12,140,177 B2 * 11/2024 Huang .................. F16M 11/42
2006/0124394 A1 6/2006 Bracken
2007/0035075 A1 * 2/2007 Lin ......................... B25B 5/085 269/6
2013/0025969 A1 * 1/2013 Horn ......................... E06C 7/48 182/8
2013/0032985 A1 * 2/2013 Douglas ................... B25H 1/10 269/315
2013/0134642 A1 * 5/2013 Chen ....................... B25B 5/166 269/6
2014/0014797 A1 * 1/2014 McSherry ................. F16B 2/12 248/231.41
2014/0166397 A1 6/2014 Reynolds
2015/0259982 A1 * 9/2015 Maragliano ............. E06C 7/505 29/525.01
2015/0283680 A1 * 10/2015 Ursell ................... B25B 1/2489 269/149
2015/0292535 A1 * 10/2015 Albin ..................... A44B 11/16 24/68 A
2016/0369563 A1 * 12/2016 Adcock ..................... E06C 7/42
2017/0191589 A1 * 7/2017 Floyd ....................... F16L 23/06
2020/0115959 A1 * 4/2020 Cohen ..................... E06C 7/186
2021/0370335 A1 * 12/2021 Im .......................... A62C 35/68
2022/0056715 A1 * 2/2022 O'Mara .............. E04G 21/3242
2022/0260896 A1 * 8/2022 Chan .......................... F16B 2/12
2022/0395963 A1 * 12/2022 Draeger .................. B25B 5/102
2023/0136041 A1 * 5/2023 Hershkovich ............. B25B 5/02 269/86
2023/0272811 A1 * 8/2023 Stabler ...................... B25B 1/08 248/205.1
2023/0404244 A1 * 12/2023 Bohmbach ................ A45F 3/14

* cited by examiner

LADDER STABILITY ANCHOR

TECHNICAL FIELD

The technical field relates to ladder attachment devices and, more specifically, to devices for anchoring a ladder to a roof or other structure.

BACKGROUND

A typical use of a ladder, such as an extension ladder or a telescoping ladder, involves the base of the ladder resting on the ground and an upper end of the ladder leaning against a support structure, such as a roof, tree, or utility pole. This usage of a ladder can be risky due to the general instability of a ladder leaning against a support. For instance, a ladder may slip or move due to uneven transitions between the ladder and the support structure, or when the support structure is a smooth or slippery surface (such as aluminum fascia of a roof top). In addition, ladders may slip out as a result of loose ground or wet surfaces, or may shift due to wind or accidental collisions. Further, quick movements by the user or overreaching may cause the ladder to become unbalanced, which can result in the ladder swaying or even tipping over.

Anchoring a ladder to the support structure via an anchoring device can stabilize the ladder and minimize movement. By one approach, a standard screw-type vise coupled to the ladder is clamped around a support structure by threading the movable jaw closer to the fixed jaw via a T-bar screw handle. However, threading the movable jaw into position can require many turns of the T-bar and does not quickly lock or release the clamp.

Figure 1:
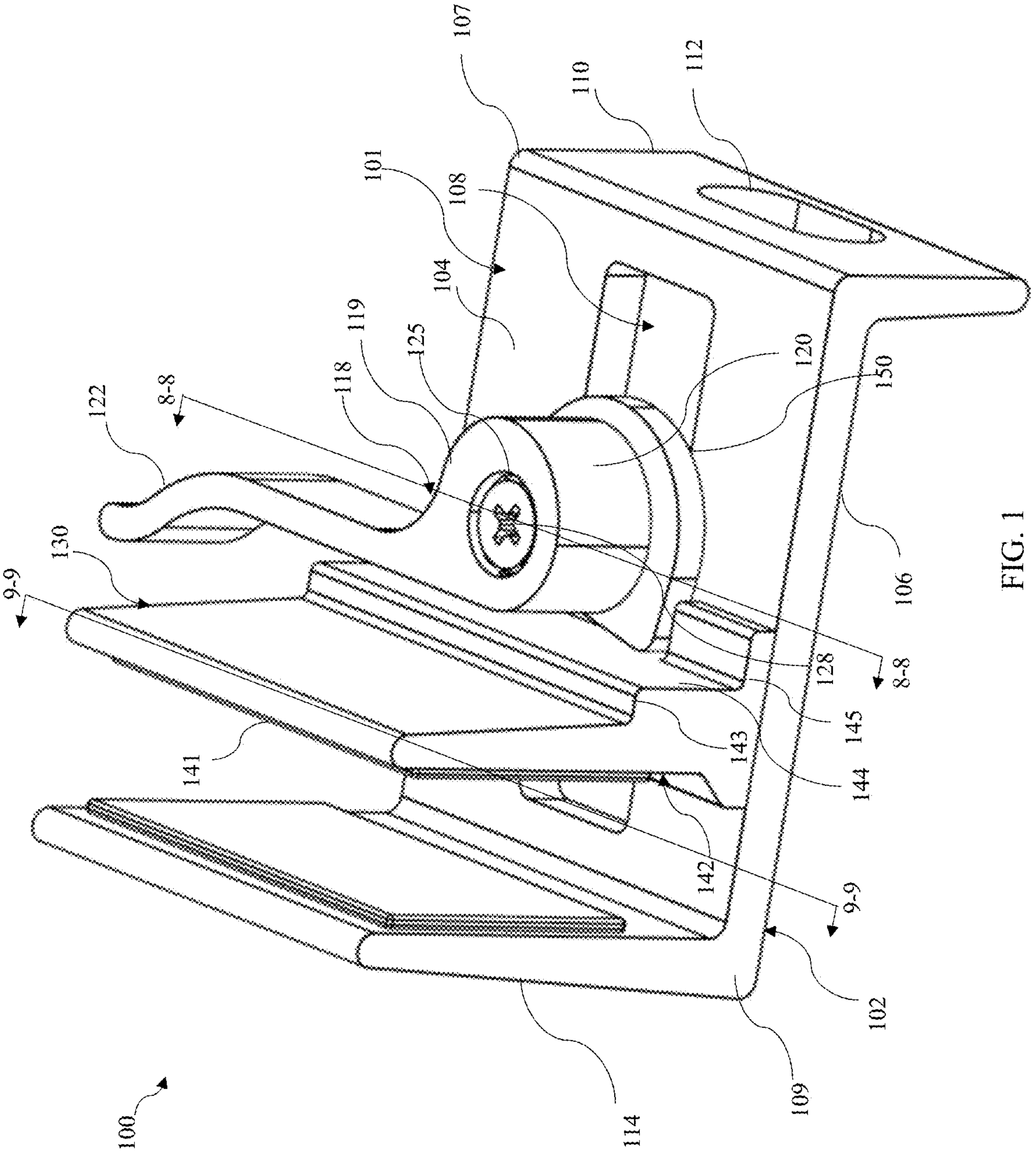
FIG. 1 is a left-side top perspective view of an anchor device.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present disclosure. Also, common but well-understood elements that are useful or necessary in a commercially feasible embodiment may be omitted in order to facilitate a less obstructed view of these various embodiments of the present invention. Certain actions and/or steps may be described or depicted in a particular order of occurrence when such specificity with respect to sequence is not actually required. The terms and expressions used herein have the ordinary technical meaning as is accorded to such terms and expressions by persons skilled in the technical field as set forth above except where different specific meanings have otherwise been set forth herein.

Further, the following description of illustrative embodiments according to principles of the present disclosure is intended to be read in connection with the accompanying drawings, which are to be considered part of the entire written description. In the description of embodiments disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to certain embodiments. Accordingly, the invention expressly should not be limited to such embodiments illustrating some possible non-limiting combination of features that may exist alone or in other combinations of features.

DETAILED DESCRIPTION

Figure 2:
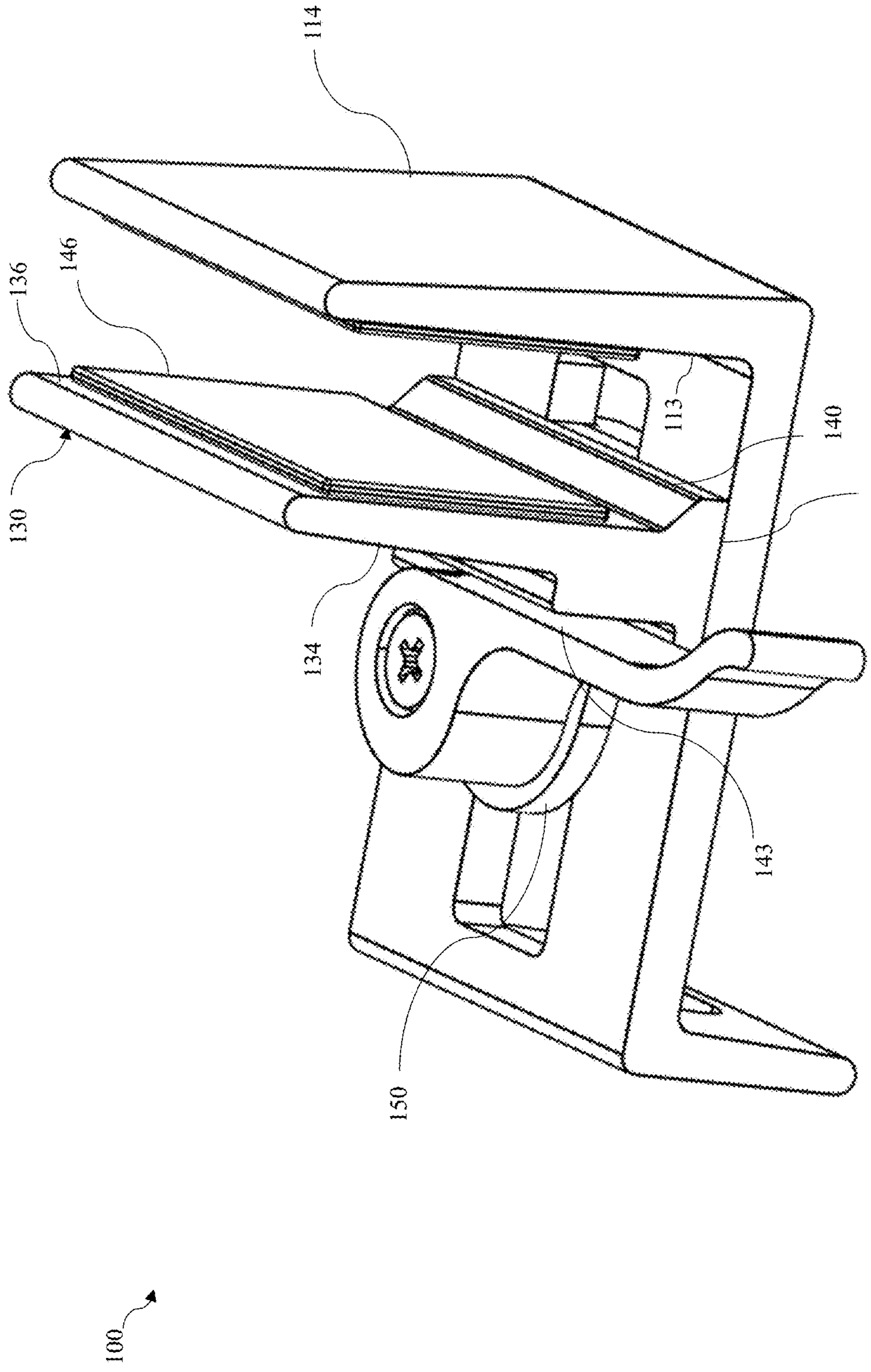
FIG. 2 is a right-side top perspective view of the anchor device of FIG. 1.
Figure 3:
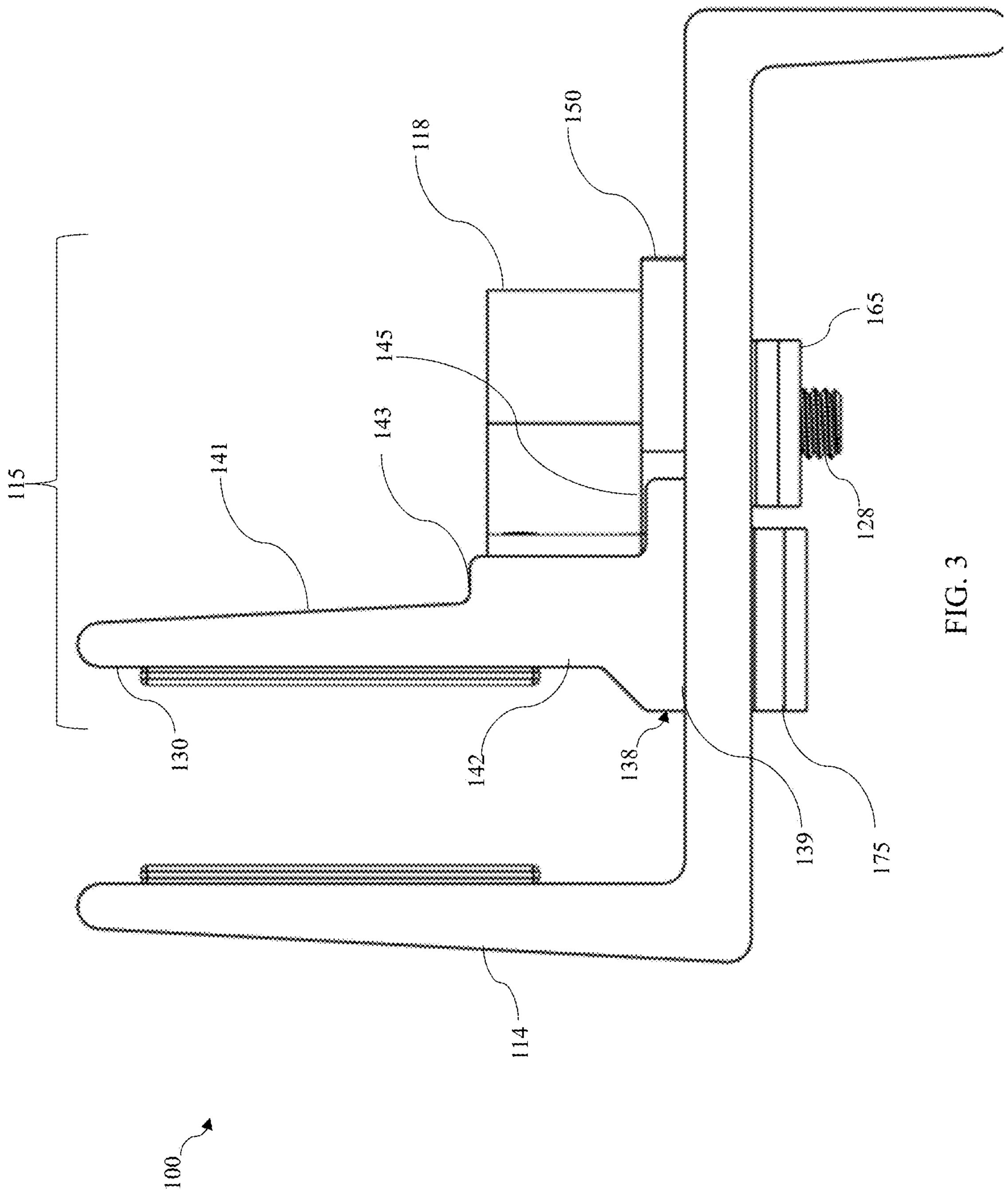
FIG. 3 is a left-side elevational view of the anchor device of FIG. 1.

As shown generally in FIGS. 1-3, there is an exemplary anchor device 100 which may be used, for example, to anchor and stabilize a ladder. Specifically, a user may attach the anchor device 100 to a ladder, for example, a rail or rung of the ladder, via a tether, and clamp the anchor device 100 to a support structure or object, for example, an eave of a roof. So attached, the anchor device 100 reduces the chances of the ladder slipping or moving during use. The anchor device 100 is also easy to install, adjust, and clamps and releases quickly.

The anchor device 100 generally includes a main body 101 having a supporting base 102, a fixed clamping bracket 114 at one end of the base 102, a moving clamping bracket 130 as part of a moving clamp assembly 115, an elongate opening or track 108 in the base 102 along which the moving clamp assembly 115 moves, and a cam actuator 118. Specifically, the moving clamp assembly 115 can slide along the track 108, which allows the position of the moving clamping bracket 130 relative to the fixed clamping bracket 114 to be easily adjusted for clamping objects of different sizes. Pivoting the cam actuator 118 then tightens and locks the moving clamping bracket 130 in position against an object.

The main body 101 is defined in part by the supporting base 102, which may be generally rectangular and flat. Specifically, the supporting base 102 has first and second opposing surfaces 104, 106. The first surface 104, for instance, may be an "upper" surface which faces the clamping side of the anchor device 100, while the second surface 106 may be a "lower" surface and face away from the clamping side of the anchor device 100. The surfaces 104, 106 define a rectangular profile for the supporting base 102. Further, the surfaces 104, 106 are flat and smooth such that the moving clamp assembly 115 can be easily slid along the opening or track 108, and such that the moving clamp assembly 115 can be tightened firmly against the surfaces 104, 106 when the moving clamp assembly 115 is locked in position, as described further below. The opening or track 108 may have a generally rectangular shape and extends a substantial length of the base 102 between a first end 107 and a second end 109 of the base 102.

An attachment flange 110 extends axially from the lower surface 106 at the first end 107 of the supporting base 102. The attachment flange 110 includes at least one opening 112 for attaching a tether, clip, lanyard, rope, or other form of attachment to the anchor device 100. The anchor device 100 can thus be tethered or otherwise coupled to a ladder. The illustrated embodiment includes a single large opening 112, though in some embodiments there may be two openings. The shape, size, and position of the opening 112 is not limited and can be selected based on the type of tethers or attachments to be used with the anchor device 100. For example, an opening may be a long slit or may be wider. By one approach, the opening 112 is positioned on the attachment flange 110 so that a metal clip can clip on to the attachment flange 110.

The fixed clamping bracket 114 extends axially from the upper surface 104 of the supporting base 102 at the second end 109 and spans an entire width of the base 102. The fixed clamping bracket 114 may be formed integrally with the supporting base 102. In an illustrative embodiment, the main body 101 is a single piece, with the supporting base 102, the fixed clamping bracket 114, and the attachment flange 110 all formed integrally.

As noted above, the moving clamping bracket 130 is part of the moving clamp assembly 115 and is configured to slide along the track 108 to increase and decrease the clamping space between the fixed clamping bracket 114 and the moving clamping bracket 130 to adjust to the size of the object being clamped. Like the fixed clamping bracket 114, the moving clamping bracket 130 has a length that spans an entire width of the base 102. Further, the fixed clamping bracket 114 and the moving clamping bracket 130 may each have a thickness that is at least partially tapered, having a gradually tapering cross-section towards the top of the brackets 114, 130. The inner surfaces 113, 134 of the brackets 114, 130 may be generally parallel to one another and, by one approach, may include gripping surfaces. For instance, in some embodiments, each of the brackets 114, 130 may have a rubber pad 146 fixed thereon. The rubber may be textured to enhance gripping. The rubber pads 146 also prevent the clamped object (e.g., an eave) from being damaged.

While an upper portion 141 (and a majority) of the moving clamping bracket 130 may have a geometry corresponding to the fixed clamping bracket 114, a lower portion 142 of the moving clamping bracket 130 includes different features, including a generally widened bracket base 138 having a lower sliding surface 139 configured to slide along the upper surface 104 of the anchor device 100. On a first side 134 of the moving clamping bracket 130 (facing away from the fixed clamping bracket 114), the lower portion 142 is widened by a step or projection 143 that spans a length of the moving clamping bracket 130. The step 143 has a height and width such that an outer surface 144 of the step 143 extends close enough to the cam actuator 118 so that the cam actuator 118 can engage the outer surface 144 when actuated, as described further below.

Two opposing lower steps or feet 145 may also extend from the outer surface 144 of the step 143 at each end of the bracket base 138. The opposing steps 145 define a groove 148 (FIG. 4) therebetween that receives a portion of an upper plate 150 of the moving clamp assembly 115. The opposing steps 145 may each have a length that extends from a side of the moving clamping bracket 130 and inwards towards the track 108. The opposing steps 145 do not extend all the way to the track 108, such that the upper surface 104 of the supporting base 102 is exposed between the track 108 and each step 143 so that the upper plate 150 can be seated thereon.

The opposing steps 145 define a portion of the bracket base 138 on the first side 134 of the moving clamping bracket 130 and have lower surfaces continuous with the sliding surface 139 of the bracket base 138. On a second side 136 of the moving clamping bracket 130 (facing the fixed clamping bracket 114), the bracket base 138 is widened by a bottom projection 140 that radially extends from the moving clamping bracket 130 and spans a length of the moving clamping bracket 130. In the illustrated embodiment, the projection 140 has a chamfered upper surface and has a bottom surface continuous with the sliding surface 139 of the bracket base 138.

The moving clamp assembly 115 includes the moving clamping bracket 130, the cam actuator 118, the upper plate 150, an inner moving plate 155, a first lower plate 165, and a second lower plate 175. Specifically, the moving clamping bracket 130, cam actuator 118, and the upper plate 150 are positioned on one side of, i.e., "above", the track 108, while the first lower plate 165 and second lower plate 175 are positioned on an opposite side of, i.e., "below", the track 108. The inner moving plate 155 is sized and dimensioned to slide within the track 108. The moving clamping bracket 130 is coupled to the inner moving plate 155 and the second lower plate 175, while the cam actuator 118 is coupled to the inner moving plate 155 and the first lower plate 165. The separate coupling of the cam actuator 118 and the moving clamping bracket 130 to the inner moving plate 155, without being directly coupled to one another, enables the moving clamping bracket 130 to move relative to the cam actuator 118 during the clamping function, as explained further below.

The entire moving clamp assembly 115 is configured to move or slide generally as a unit along the track 108 to adjust the position of the moving clamping bracket 130 relative to the fixed clamping bracket 114. The moving clamp assembly 115 is also configured to tighten and lock the brackets 114, 130 in position around the object when the cam actuator 118 is actuated to achieve a firm clamp.

The cam actuator 118 is seated on the upper plate 150, the latter which is disposed over the track 108 with sides of the upper plate 150 seated on the upper surface 104 of the supporting base 102 on opposing sides of the track 108. That is, the upper plate 150 has a width that is wider than the track 108 so that it can seat on and slide against the upper surface 104 and be tightened or clamped against the upper surface 104 when the cam actuator 118 is actuated.

Figure 4:
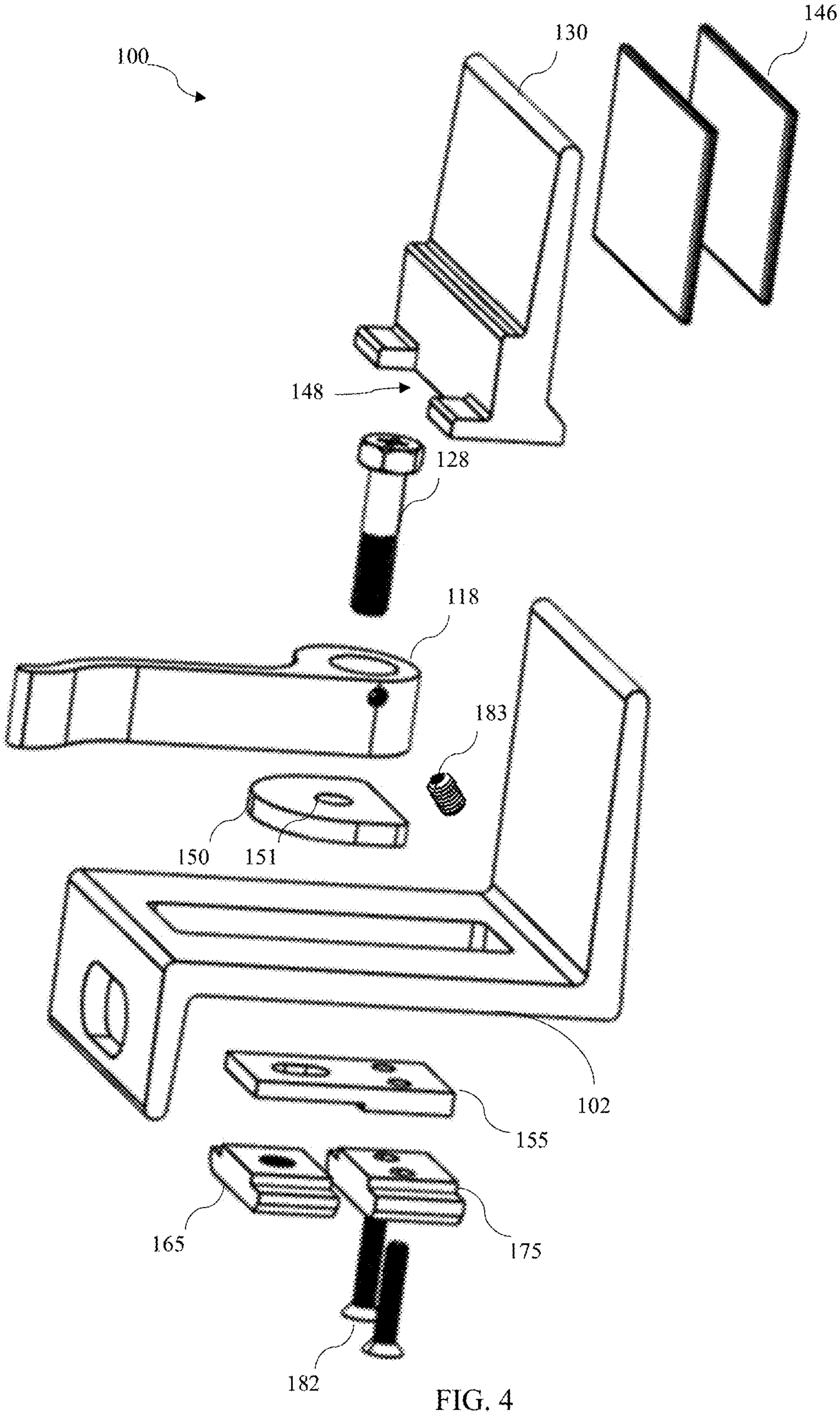
FIG. 4 is an exploded view of the anchor device of FIG. 1.
Figure 5:
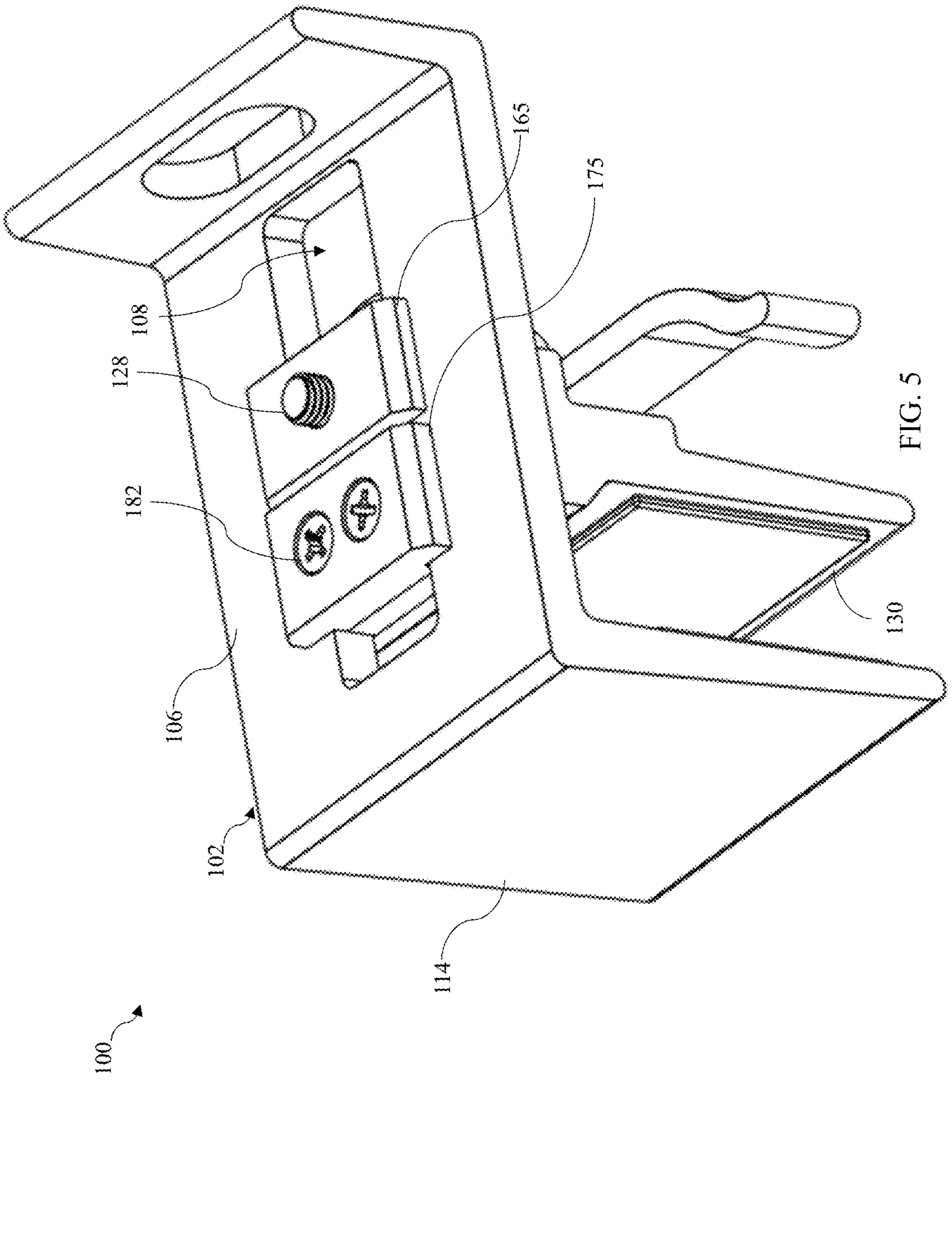
FIG. 5 is a bottom perspective view of the anchor device of FIG. 1.

With reference to FIGS. 1, 2, and 4, the upper plate 150 may have a generally semi-circular or D shape, having a rounded portion and a flat side, with the flat side of the upper plate 150 facing and in close proximity to the moving clamping bracket 130. Specifically, as noted above, the flat side of the upper plate 150 is slightly smaller than the groove 148 between the opposing steps 145 of the moving clamping bracket 130 so that the flat side of the upper plate 150 generally indexes and stays in line within the groove 148. The remainder of the upper plate 150 may have a curved geometry, though other shapes are possible.

The upper plate 150 includes a generally central opening or passage 151 so that a bolt 128 can extend from the cam actuator 118 to the first lower plate 165.

The cam actuator 118 may be a cam lever that includes a cylindrical cam body 119 having a cam surface 120 and an elongated handle 122 extending from the cam body 119. In a non-clamping or unlocked/adjustable state of the anchor device 100, in which the position of the moving clamping bracket 130 can be slidingly adjusted, the cam body 119 is positioned so that the cam surface 120 is spaced from or does not exert a substantial force on the surface 144 of the moving clamping bracket 130. When the cam body 119 is rotated or pivoted into a clamped and locked position of the anchor device 100, e.g., via the handle 122, the cam surface 120 is rotated into forceful engagement with the surface 144 of the moving clamping bracket 130. Specifically, the cam surface 120 exerts pressure on the surface 144 and forces the moving clamping bracket 130 towards and against the object. This movement of the moving clamping bracket 130 further reduces the clamping space between the moving clamping bracket 130 and the fixed clamping bracket 130 to provide a tightened, firm clamping of the object.

Figure 10B:
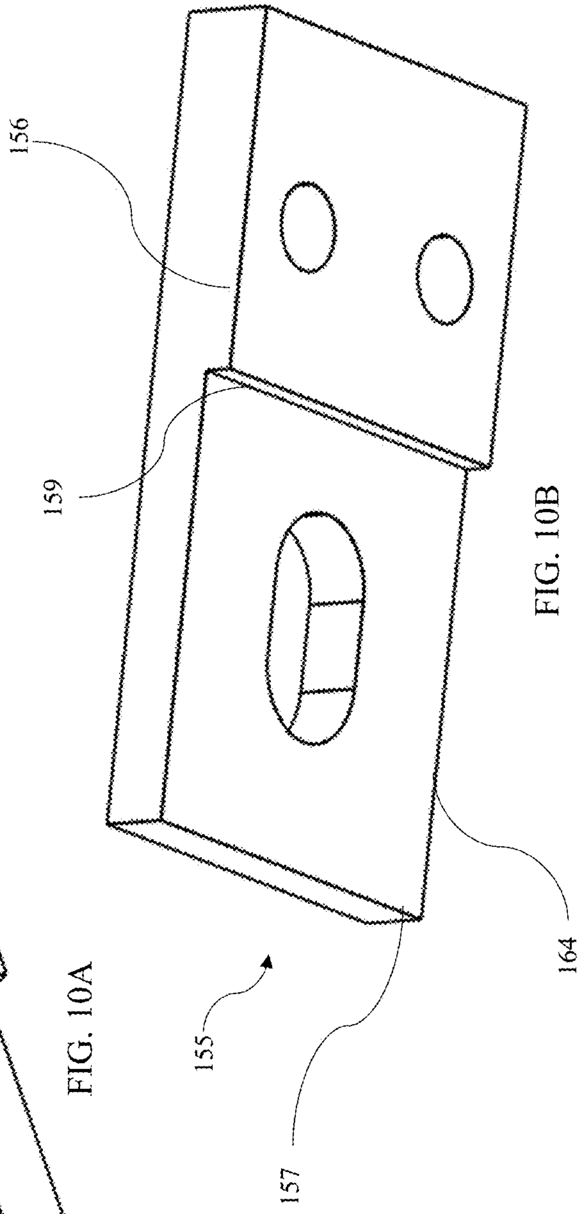
FIG. 10B is a bottom perspective view of the moving plate of the anchor device of FIG. 1.
Figure 10A:
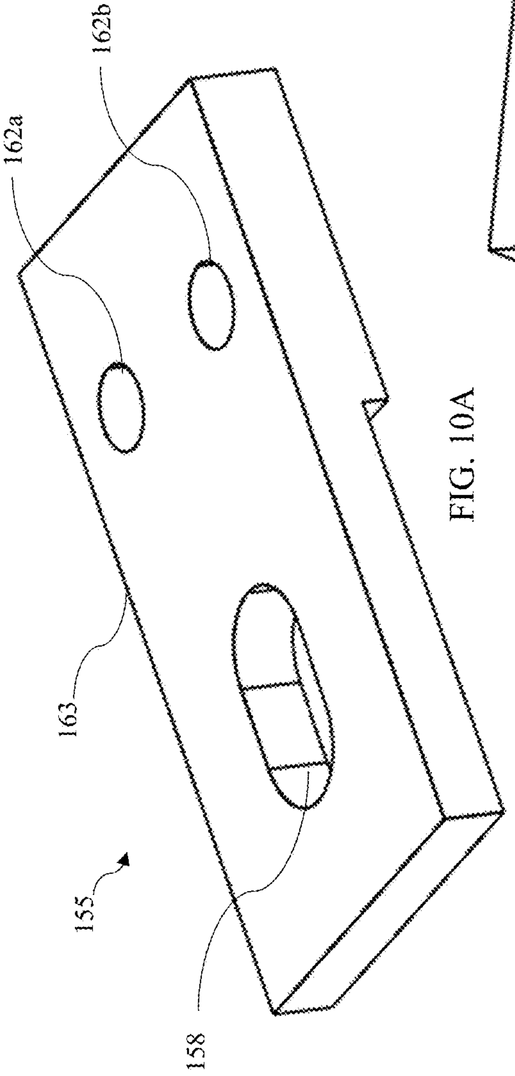
FIG. 10A is a top perspective view of a moving plate of the anchor device of FIG. 1.

This movement of the moving clamping bracket 130 is possible because the moving clamp assembly 115 is configured with sufficient play such that the moving clamping bracket 130 can undergo some amount of linear movement along the track 108 as a result of the rotation of the cam body 119. In other words, the moving clamping bracket 130 is moved linearly along the track 108 relative to the cam body's 119 linear position along the track 108. Specifically, the inner moving plate 155, which is attached to both the moving clamping bracket 130 and the cam actuator 118, includes an elongated opening or slot 158 (FIG. 10A) that creates play so that the moving clamping bracket 130 can be slightly thrusted forward relative to a position of the actuator 118 during the clamping and locking function. This is described in further detail below.

It will be appreciated that for rotation of the cam body 119 to drive linear movement of the moving clamping bracket 130 towards the object, the cam body 119 needs to be substantially fixed in position along the track 108. Otherwise, engagement of the cam surface 120 with the surface 144 of the moving clamping bracket 130 could cause the cam body 119 to slide or slip out linearly in the opposite direction along the track 108 as a result of the play created by the elongated opening 158 (FIG. 10A) of the inner moving plate 155, instead of forcing the moving clamping bracket 130 forward. Thus, the mechanism would not function correctly.

To function correctly so that there is linear movement of the moving clamping bracket 130, the moving clamp assembly 115 is configured so that a portion of the assembly 115 becomes substantially locked or fixed from linear motion along the track 108 just before or just as the moving clamping bracket 130 is contacted by the cam surface 120, and a portion of the moving clamp assembly 115 is movable during the contact. Specifically, rotation of the cam body 119 forces the cam actuator 118 and upper plate 150 on one side of the track 108 and the first lower plate 165 on the other side of the track 108 to lock against or clamp the supporting base 102 of the anchor device 100. This substantially fixes the cam actuator 118, upper plate 150, and first lower plate 165 in a position along the track 108. At nearly the same time, the moving clamping bracket 130, the moving plate 155, and the second lower plate 175 are shifted slightly forward due to the play in the moving plate 155.

Figure 6:
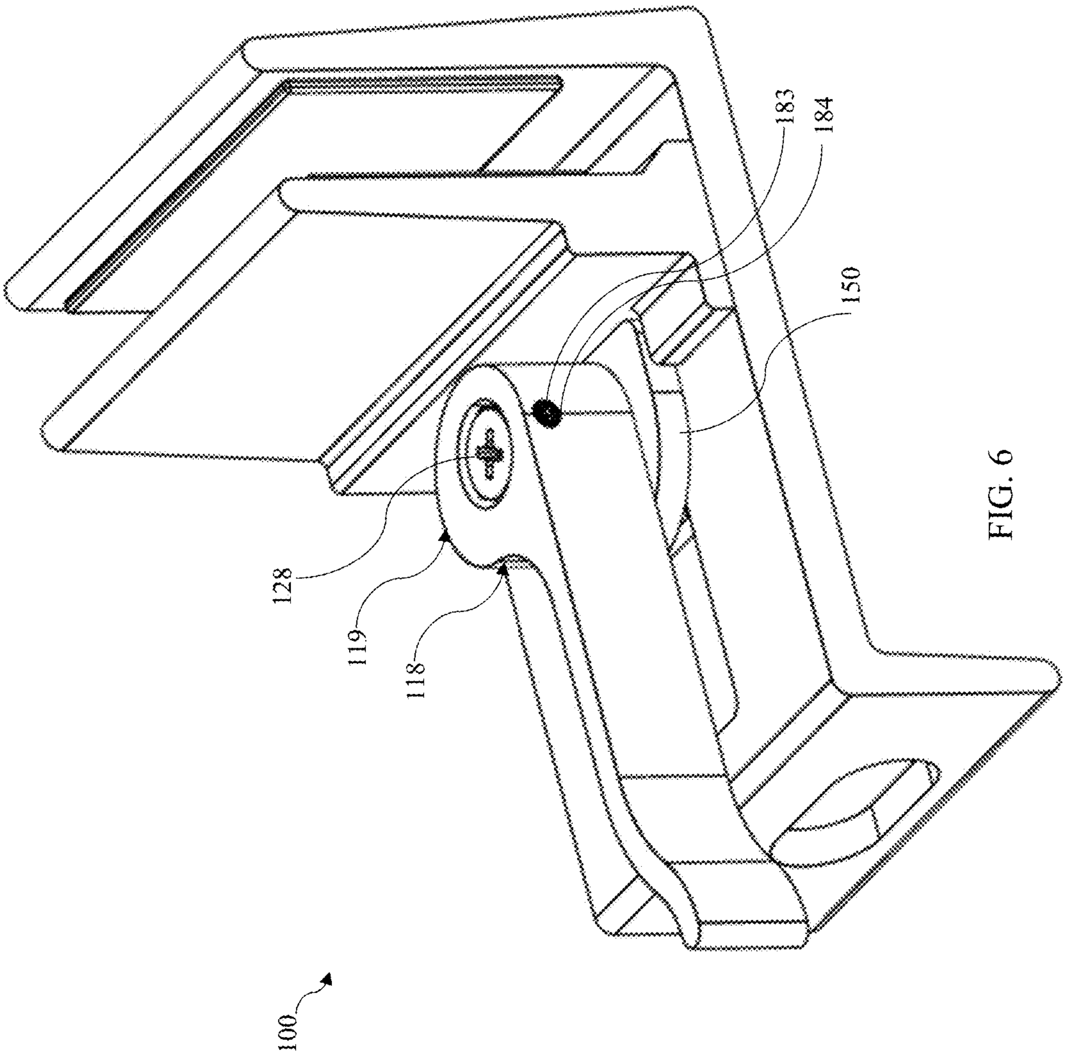
FIG. 6 is a right-side top perspective view of the anchor device of FIG. 1 at a different position of the moving clamp.
Figure 7:
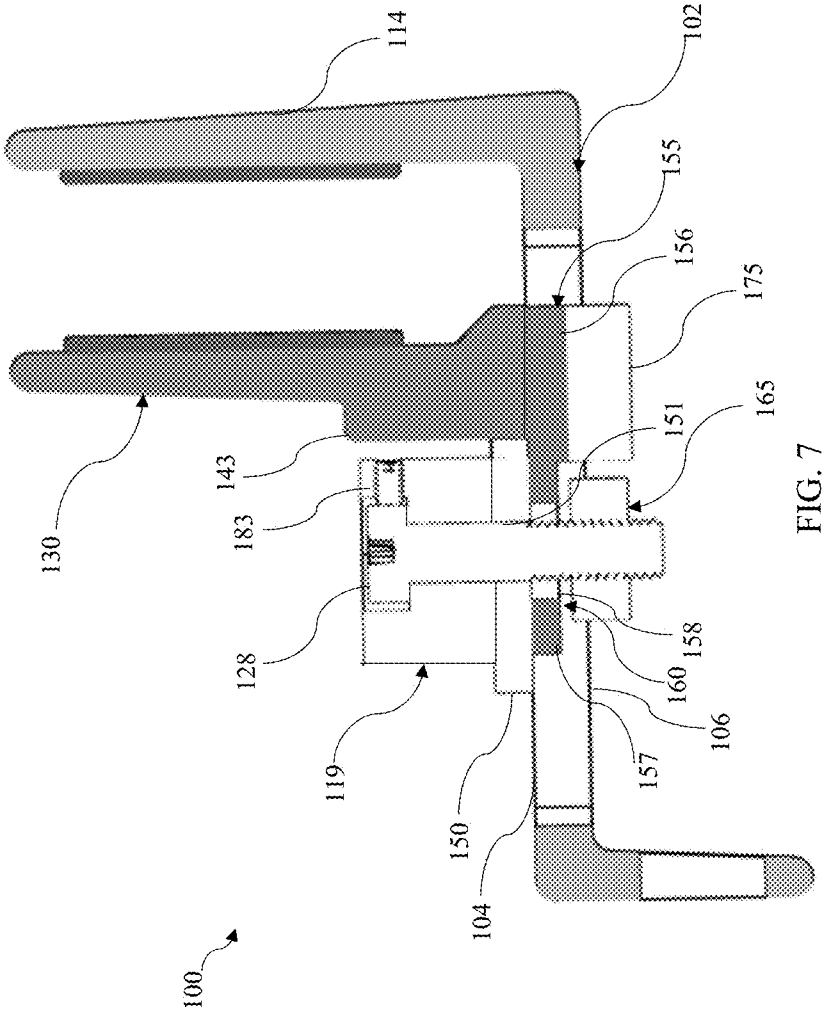
FIG. 7 is a centrally taken cross-section view of the anchor device of FIG. 1.
Figure 8:
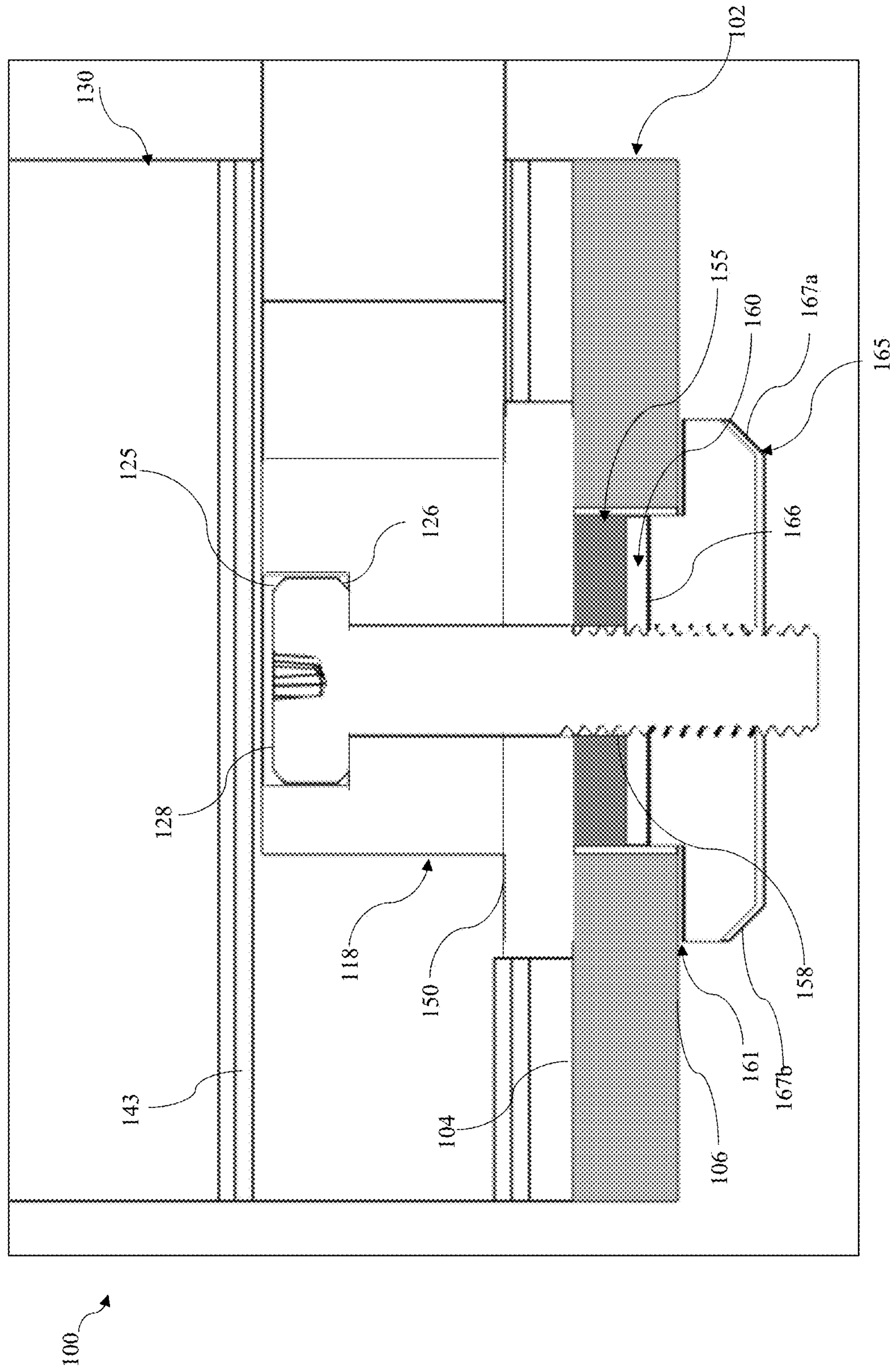
FIG. 8 is an enlarged portion of a cross-section view of the anchor device of FIG. 1 taken along section line 8-8 of FIG. 1.
Figure 11:
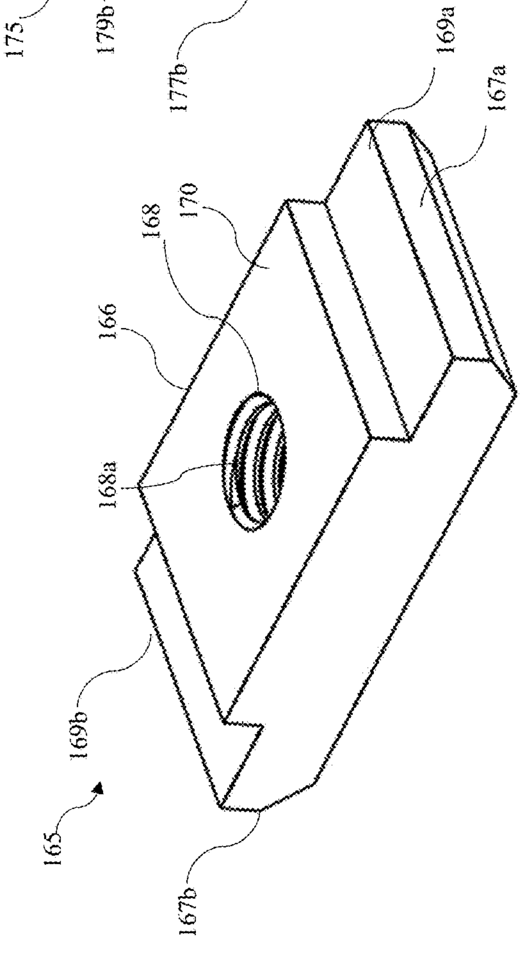
FIG. 11 is a top perspective view of a first lower plate of the anchor device of FIG. 1.

To provide the above-mentioned functions, the cam actuator 118 includes a central passage 125 for receiving a bolt 128 or other threaded fastener. In embodiments, a top of the passage 125 includes an inner flange portion or step 126 that the head of the bolt 128 may be adjacent to or seated on so that the bolt 128 is retained within the cam body 119 when the bolt 128 is rotated (and which thus limits axial movement of the bolt 128 relative to the cam body 119). The bolt 128 is sufficiently long to extend through the cam actuator 118, the opening 151 of the upper plate 150, the opening 158 (FIG. 10A) of the inner moving plate 155, and a threaded passage 168 (FIG. 11) of the first lower plate 165. With reference to FIGS. 4, 6, and 7, a set screw 183 is threaded into a radially disposed passage 184 of the cam body 119 into engagement with the head of the bolt 128 to fix the bolt 128 so rotation of the cam body 119 drives rotation of the bolt 128. Rotating the cam actuator 118 in a first direction (e.g., clockwise) thus causes corresponding rotation of the bolt 128, which causes axial movement of the cam actuator 118, upper plate 150, and first lower plate 165 to clamp the supporting base 102. That is, rotating the cam actuator 118 ratchets the cam actuator 118, upper plate 150, and first lower plate 165 against the base 102 so that these pieces cannot move along the track 108, permitting the rotated cam surface 120 to nearly simultaneously force the moving clamping bracket 130 forward along the track 108 to tighten the moving clamping bracket 130 against the object. Advantageously, these locking and clamping functions only require a less than or equal to 180° rotation of the cam actuator 118.

As will be appreciated, the moving clamping bracket 130 is held firmly in its new position by the cam surface 120, which in turn is held in position due to the entire cam actuator 118 being locked against the base 102. The clamping hold of the brackets 114, 130 around the object is released quickly when the cam actuator 118 is rotated in an opposite direction (e.g., counterclockwise). For instance, in a 180° or less turn of the cam actuator 118 from the clamped position, the moving clamp assembly 115 is easily slidable/adjustable along the track 108.

It is noted that removal of the set screw 183 allows the initial threading position of the bolt 128 to be adjusted, for example if it is determined that more or less tension is needed for the clamping and locking functions to occur simultaneously. The top of the bolt 128 is accessible at a top of the cam actuator 118 and may be rotated via a tool (e.g., a screwdriver) after the set screw 183 is loosened or removed.

With reference to FIGS. 3, 5, 7, 8, and 11, and as noted above, the first lower plate 165 is disposed "below" the track. The first lower plate 165 includes a generally rectangular central body portion 166 and two opposing flange portions 167*a*, 167*b* extending from the central body portion 166 that have surfaces 169*a*, 169*b* that are recessed relative to an upper surface 170 of the central body portion 166. When assembled in the device 100, the central body portion 166 at least partially extends up into the track 108, having a width that is slightly less than a width of the track 108 and that permits sliding of the central body portion 166 along the track 108. The flange portions 167*a*, 167*b* are configured to contact and clamp against the lower surface 106 of the base 102 on respective sides of the track 108 during the locking and clamping functions of the device 100. In a non-clamping position, the flange portions 167*a*, 167*b* are spaced from the lower surface 106 creating a gap 161 therebetween. A passage 168 including internal threading 168*a* extends through the central body portion 166 and is axially aligned with the passage 125 of the cam actuator 118, the opening 151 of the upper plate 150, and the opening 158 of the inner moving plate 155. The first lower plate 165 thus receives the bolt 128, and, in embodiments, the bolt extends all the way through the first lower plate 165. When the cam actuator 118 is rotated to rotate the bolt 128, external threading of the bolt engages the internal threading 168*a* of the first lower plate 165, which drives the flange portions 167*a*, 167*b* towards the track 108 and against the lower surface 106 and ultimately clamps the base 102 between the flange portions 167*a*, 167*b* and the cam actuator 118/upper plate 150.

With reference to FIGS. 3, 5, 7, 9, and 12, and as noted above, the second lower plate 175 is also disposed "below" the track. In embodiments, the second lower plate 175 may be configured to have a similar geometry to the first lower plate 165. For instance, as illustrated, the second lower plate 165 includes a generally rectangular central body portion 176 and two opposing flange portions 177*a*, 177*b* extending from the central body portion 176 that have surfaces 179*a*, 179*b* that are recessed relative to an upper surface 180 of the central body portion 176. When assembled in the device 100, the central body portion 176 at least partially extends up into the track 108, having a width that is slightly less than a width of the track 108 and that permits sliding of the central body portion 176 along the track 108. When correctly assembled, the flange portions 177*a*, 177*b* are disposed just below the lower surface 106 of the base 102. There may be a slight gap between the flange surfaces 179*a*, 179*b* and the lower surface 106 of the base 102 to facilitate sliding of the second lower plate 175 along the track 108.

Figure 9:
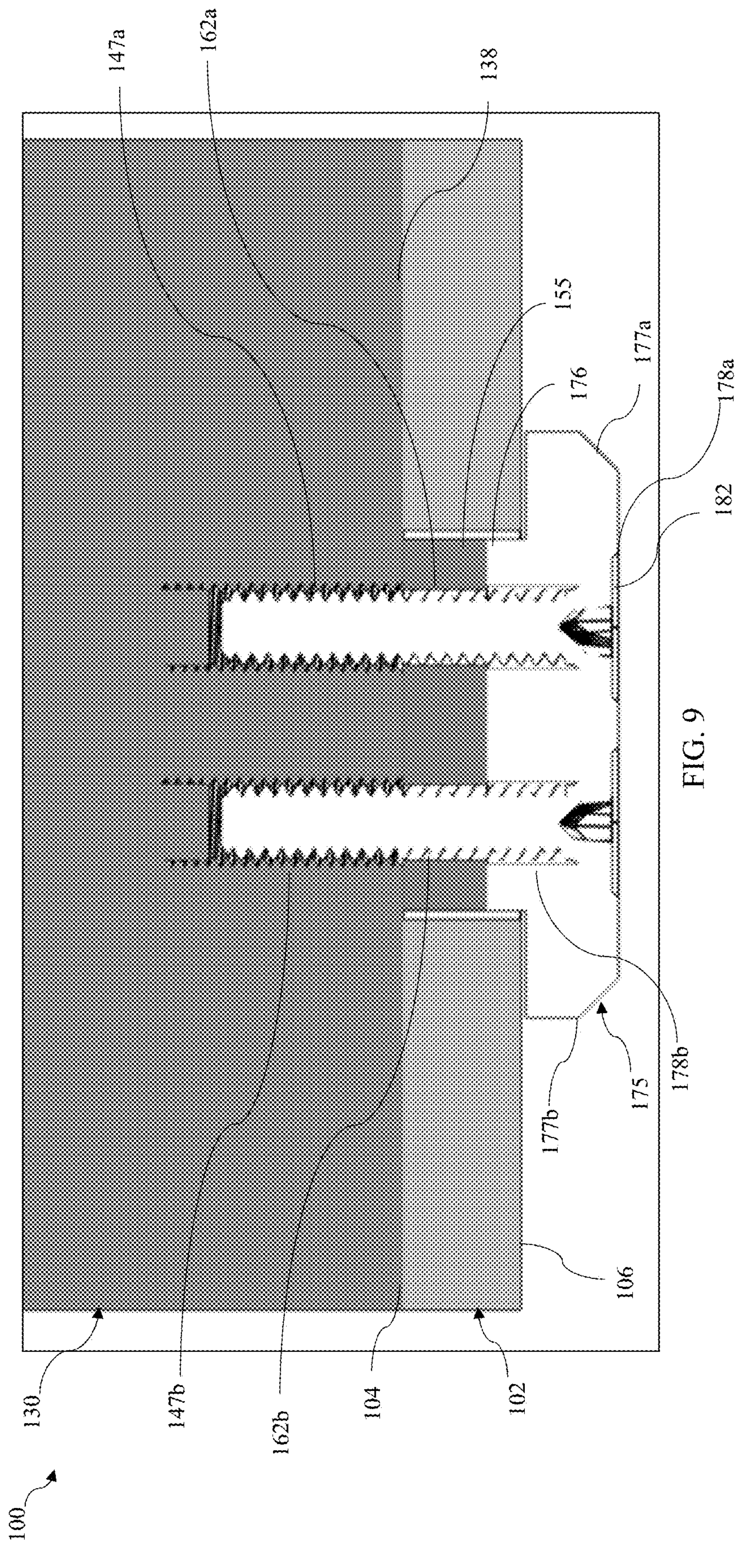
FIG. 9 is an enlarged portion of a cross-section view of the anchor device of FIG. 1 taken along section line 9-9 of FIG. 1.
Figure 12:
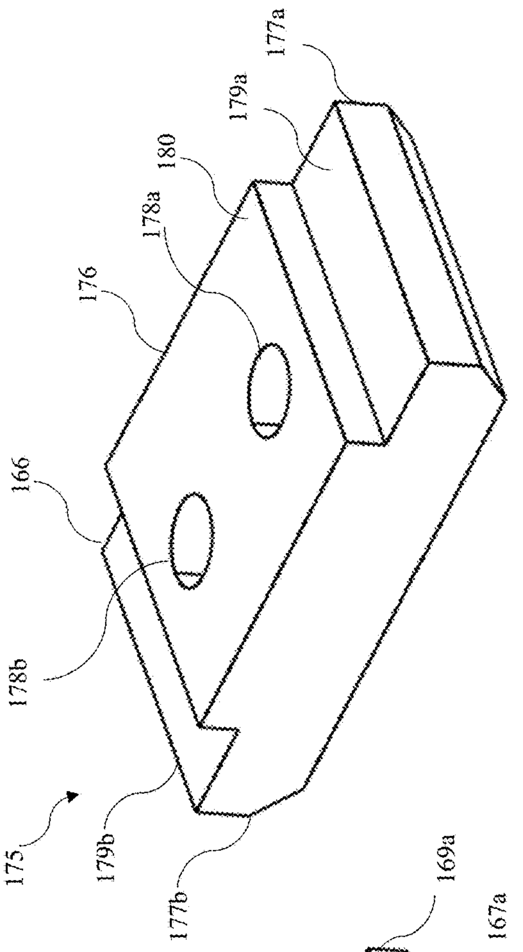
FIG. 12 is a top perspective view of second lower plate of the anchor device of FIG. 1.

With particular reference to FIGS. 9 and 12, the second lower plate 175 includes two passages 178*a*, 178*b* for receiving fasteners to couple the second lower plate 175 to the inner moving plate 155 and the moving clamping bracket 130. For instance, two screws 182 may be inserted into the passages 178*a*, 178*b*, which are aligned with corresponding passages 162*a*, 162*b* in the inner moving plate 155 and corresponding passages 147*a*, 147*b* on the moving clamping bracket 130. The passages 147*a*, 147*b* include internal threading. When assembled, the second lower plate 175, the inner plate 155, and the moving clamping bracket 130 contact or nearly contact one another. In an illustrative embodiment, the upper surface 180 of the central body portion 176, which protrudes within the track 108, supports the moving plate 155 and maintains the moving plate 155 in its proper position.

It will be appreciated that other numbers of fasteners and openings and/or types of fasteners are possible to couple the second lower plate 175, inner moving plate 155, and moving clamping bracket 130 together. It is further contemplated that the moving plate 155 and the moving clamping bracket 130, or the moving plate 155 and the second lower plate 175 may be formed integrally or welded together.

With reference to FIGS. 7-10B, the inner moving plate 155, as noted above, is advantageously configured to permit linear movement between the moving clamping bracket 130 and the cam actuator 118 so that the moving clamping bracket 130 can be moved to tighten against the object while the cam actuator 118 is being ratcheted down against the base 102. The inner moving plate 155, when assembled in the device 100, is disposed within the track opening 108 and has a rectangular shape dimensioned to slide easily along the track opening 108. For instance, the inner moving plate 155 may have a width that is slightly smaller than the width of the track 108 such that the sides of the inner moving plate 155 do not contact the sides of the track 108 during sliding. The inner moving plate 155 has an upper continuous, flat surface 163 and a lower discontinuous, or stepped surface 164. Specifically, a step 159 in the lower surface 164 defines a first portion 156 of the inner moving plate 155 and a second portion 157 that has a reduced thickness relative to the first portion 156. The first portion 156 has a thickness configured to abut or seat on the second lower plate 175, and includes the two passages 162*a*, 162*b* for receiving the screws 182 or other fasteners to couple the inner moving plate 155 to the moving clamping bracket 130 and the second lower plater 175.

The second portion 157 of the inner moving plate 155 includes the elongated opening or slot 158. Specifically, the elongated opening 158 is dimensioned longer than the radius of the bolt 128 so that there is sufficient play around the bolt 128 for the inner moving plate 155 to be moved forward along the track while the cam actuator 118, upper plate 150, first lower plate 165, and bolt 128 are being fixed and locked into a position along the track during the clamping and locking operation. For example, the length of the elongated opening 158 may be at least 50% longer than the radius of the bolt 128, at least 75% longer than the radius of the bolt, or least 100% longer than the radius of the bolt 128. The elongated opening 158 may have a width that is just slightly larger than the radius of the bolt 128.

The reduced thickness of the second portion 157 creates a substantial gap 160 between the lower surface 164 of the inner moving plate 155 and the upper surface 170 of the first lower plate 165 when assembled.

The gap 160 is maintained by the first portion 156 abutting the second lower plate 175 (see FIG. 7) which maintains the inner moving plate 155 axially in position along the height of the track opening 108. The gap 160 facilitates movement of the inner moving plate 155 relative to the first lower plate 165 for the clamping operation to occur. The gap 160 may increase or decrease in size as a function of axial movement of the first lower plate 165 when the bolt 128 is rotated. Specifically, the upper surface 170 of the first lower plate 165 is axially moved to increase or reduce the size of the gap 160.

The inner moving plate 155, second lower plate 175, and moving clamping bracket 130, being coupled together, move along the track as a unit when the clamping function occurs and when the clamp is released. Specifically, when the cam actuator 118 is pivoted (e.g., in a clockwise direction) to clamp the object, the cam body 119, upper plate 150, and first lower plate 165 lock or clamp firmly against the base 102 while the cam surface 120 forces the moving clamping bracket 130 forward along the track, closer to the object. The elongated opening 158 of the inner moving plate 155 enables this movement, and the moving clamping bracket 130, inner moving plate 155, and second lower plate 175 are moved forward together. When the cam actuator 118 is pivoted in an opposite direction (e.g., in a counterclockwise direction) to release the object, the cam body 119, upper plate 150, and first lower plate 165 are loosened around the base 102 and the moving clamping bracket 130, inner moving plate 155, and second lower plate 175 are released from their biased position against the object.

Methods of clamping an object using the above-described anchor device 100 are also disclosed. In one embodiment, an object is inserted between the moving clamping bracket 130 and the fixed clamping bracket 114. A user then adjusts the position of the moving clamping bracket 130 to closely fit against the object by sliding the moving clamp assembly 115 along the track 108. A user then pivots the cam actuator 118 (e.g., in some embodiments about 180°; in other embodiments between 100° and 180°) clockwise to tighten the moving clamping bracket 130 against the object and lock the moving clamping assembly 115 firmly in place. To release the clamp, a user pivots the cam actuator 118 counterclockwise to loosen the moving clamping bracket 130 from the object and loosen the moving clamping assembly 115 so that is again slidable along the track 108. The object may be removed from between the moving clamping bracket 130 and the fixed clamping bracket 114.

The anchor device 100 may be particularly useful in clamping portions of a structure or roof to anchor a ladder while using the ladder. For instance, the device 100 may clamp fascia board, rafter, soffit, trusses, or other portions of the structure that fit between the moving clamping bracket 130 and the fixed clamping bracket 114. By one approach, the anchor device 100 permits a ladder to be secured to a rigid support that will not deflect. In some embodiments, the anchor device can accommodate objects up to about 2 inches wide. By another approach, the anchor device 100 can accommodate objects up to about 2.5 inches wide, up to about 2.75 inches wide, up to about 2.8 inches wide, up to about 2.9 inches wide, or up to about 3 inches wide. In some embodiments, the anchor device 100 can accommodate a minimum object width of about 1.0 inch wide. In some approaches, the minimum object width may be about 0.75 inches wide. In one exemplary embodiment, the anchor device 100 can accommodate objects having widths of from about 1.0 inch to about 2.75 inches.

The anchor device 100, in some embodiments, may be made primarily of aluminum or aluminum alloy. In some embodiments, some or all of the plates are made from steel. For example, the first lower plate 165 and the second lower plate 175 may be made from steel. In some approaches the metal components of the anchor device 100 may be formed, extruded or stamped from the metal materials. By one approach, the metal components are extruded and subjected to secondary machining operations.

Figure 13:
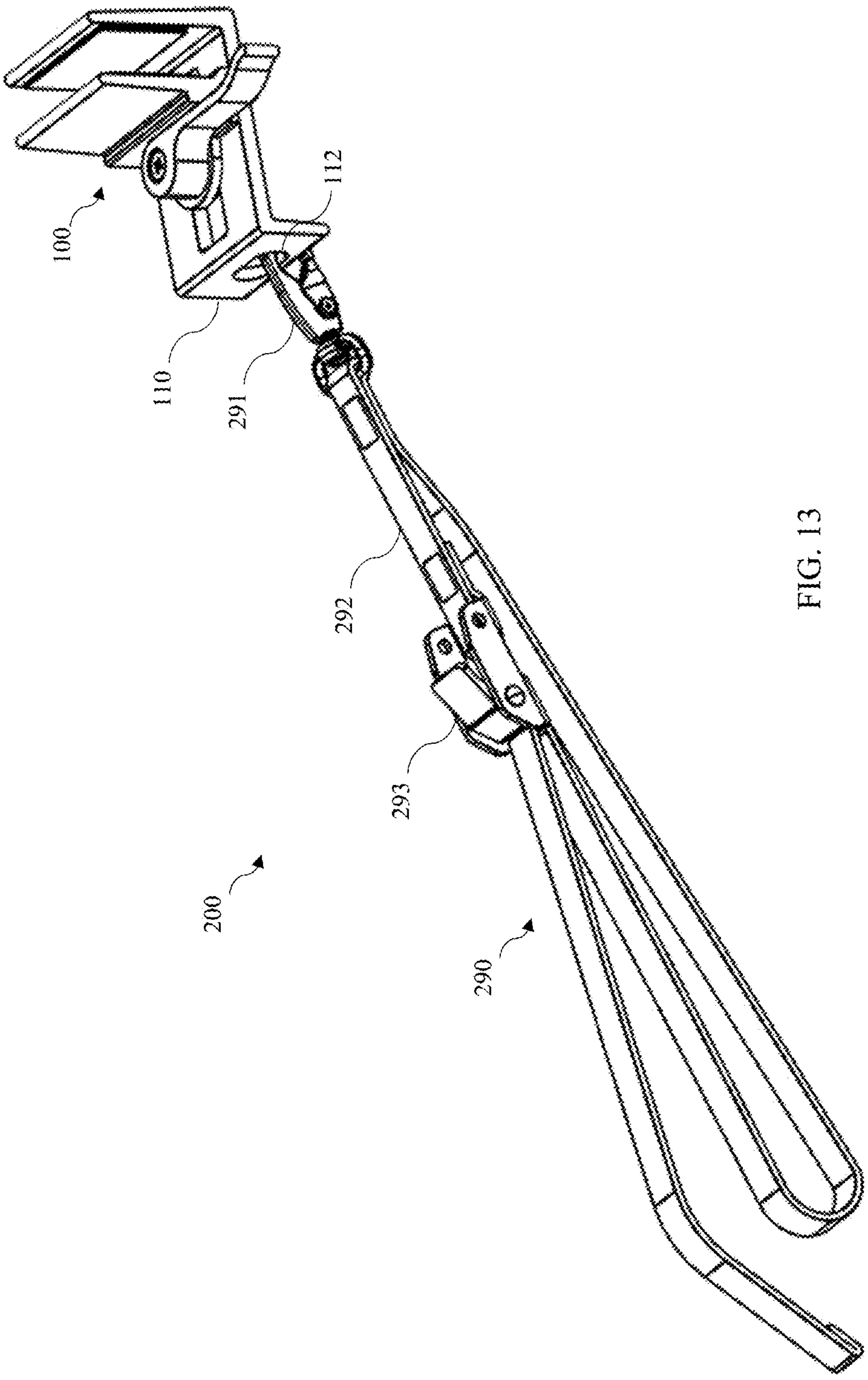
FIG. 13 is a perspective view of an anchor device assembly including the anchor device of FIG. 1 and a tether assembly coupled thereto.

With reference to FIG. 13, an anchor device assembly or system 200 includes the anchor device 100 described above and a tether assembly 290. The tether assembly 290 is coupled to the attachment flange 110 (e.g., through the opening 108) of the anchor device 100 and, in an illustrative embodiment, is wrapped around a rung or rail of ladder (typically near a top of the ladder). The tether assembly 290 may include a metal clip 291 that attaches to the attachment flange 110, a tether 292, and an adjustable buckle 293 (e.g., an adjustable cam buckle) to adjust the tether to provide supportive tension between the ladder and the anchor device 100.

Figure 14:
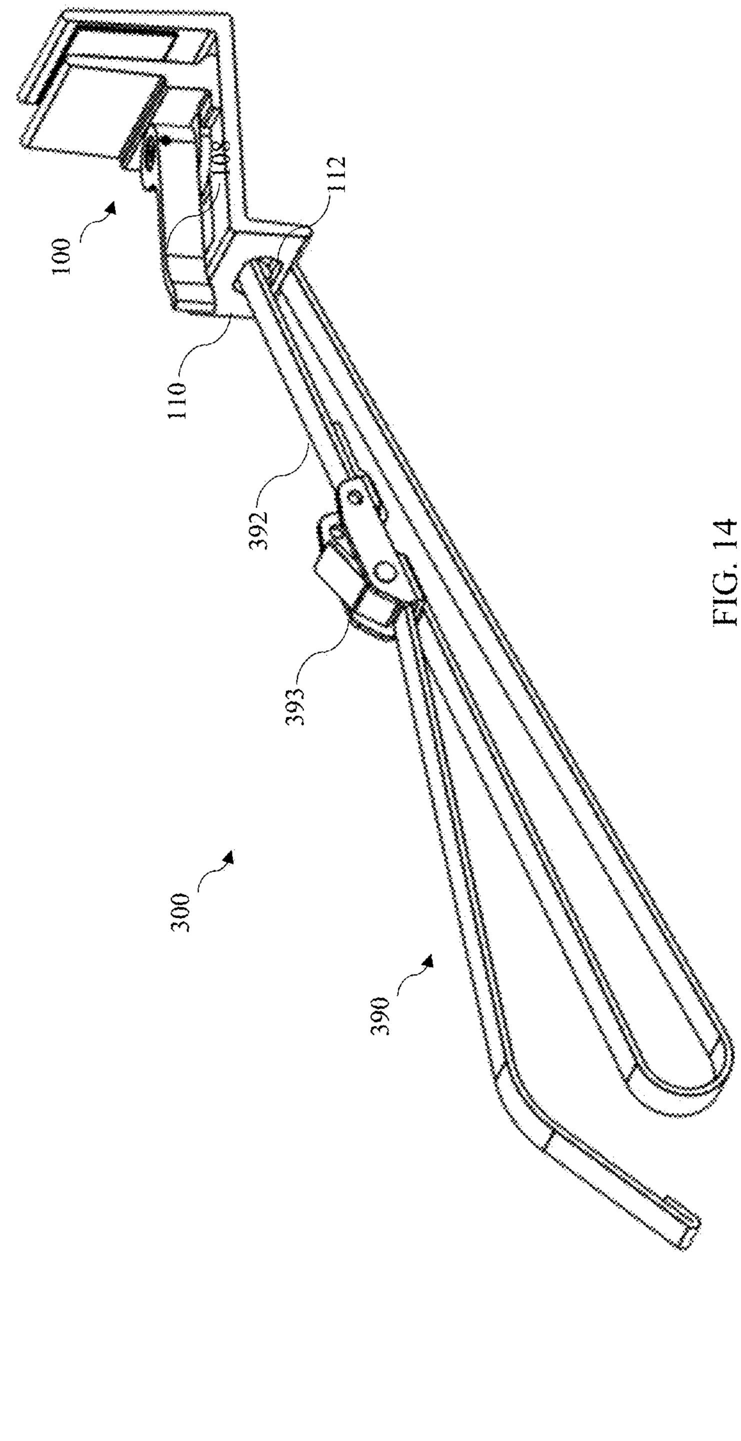
FIG. 14. is a perspective view of an alternative anchor device assembly including the anchor device of FIG. 1 and an alternative tether assembly coupled thereto.

With reference to FIG. 14, another anchor device assembly or system 300 may be substantially the same as anchor device assembly or system 200, but instead of including a metal clip 291, the tether 392 may simply wrap through the opening 112 of the attachment flange 110. In some further embodiments, other adjustment mechanisms besides a cam buckle may be used; for example, adjustment of the length of the tether 292 may occur via Velcro.

Methods of clamping an object using the above-described anchor device assemblies 200, 300 are also disclosed. A user may first extend a ladder to a desired height and wrap the tether 292 around one or two adjacent ladder rungs. In one embodiment, the tether 292 is wrapped around rungs at the mid-lock section of the ladder. The tether 292 may be wrapped around rungs that are adjacent to a support object (e.g., a roof eave) to be clamped when the ladder is standing. The anchor device 100 may then be clamped to a support object (e.g., a roof eave) in the manner described above. In a further step, the metal clip 291 may be clipped to the attachment flange 110 of the anchor device and the adjustment buckle 293 may be used to adjust the length of the tether 292 between the anchor device 100 and the ladder to a firm and supportive tension.

Advantageously, the anchor devices or anchor device assemblies described above can be easily and quickly installed. For instance, the moving clamping bracket 130 can be easily manually slid or moved into position relative to the fixed clamping bracket 114 around the object. That is, it doesn't require many turns of a handle or screw to place the moving clamping bracket 130 in position next to the object. Further, the moving clamp assembly 115 allows the moving clamping bracket 130 to be tightened around the object in a matter of seconds, and with a 180° or less turn of the cam actuator 118. Further, the handle 122 of the cam actuator 118 has ergonomic benefits and allows the user of the device to only require one hand in order to tighten the anchor device around the object. Further, the mechanism of the moving clamping assembly 115 allows the clamping position to be quickly released.

It will be understood that various changes in the details, materials, and arrangements of parts and components which have been described and illustrated above to explain the nature of the anchor device may be made by those skilled in the art within the principle and scope of the anchor device as expressed in the following claims. Furthermore, while various features have been described regarding a particular embodiment or a particular approach, the foregoing description and accompanying drawings is offered by way of illustration only and not as a limitation. Further, while embodiments have been shown and described, it will be apparent to those skilled in the art that modifications may be made to them without departing from the broader aspects of the technological contribution. The actual scope of the protection sought is defined in the following claims.

What is claimed is:

1. An anchor device for anchoring a ladder to a support object, comprising:

a main body having a base with a first end and a second end, a fixed clamping bracket at the first end of the base, and an elongated opening extending between the first end and the second end; and a moving clamping assembly that includes a moving clamping bracket, the moving clamping assembly configured to slide along the elongated opening to adjust a position of the moving clamping bracket relative to the fixed clamping bracket for clamping the support object inserted therebetween;

the moving clamping assembly further including a cam lever, wherein the cam lever is pivotable between a non-clamping position of the anchor device in which a cam surface of the cam lever is spaced from the moving clamping bracket and the position of the moving clamping assembly can be slidably adjusted and a clamping position of the anchor device in which the cam surface of the cam lever tightens the moving clamping bracket against the support object and the moving clamping assembly is locked in position, wherein the base includes a first side having a first surface and a second side opposite the first side having a second surface, and the cam lever and an upper plate of the moving clamping assembly are disposed on the first side over the elongated opening, and a first lower plate and a second lower plate are disposed on the second side under the elongated opening, and wherein when the cam lever is pivoted in the clamping position, the first lower plate is moved axially to engage the second surface and the upper plate presses against the first surface, and the cam lever, upper plate, and first lower plate clamp the base and are locked in position along the elongated opening.

2. The anchor device of claim 1, wherein the moving clamping bracket and the cam lever are coupled to an inner moving plate that moves within the elongated opening, and wherein when the cam lever is pivoted into the clamping position, the inner moving plate permits the moving clamping bracket to be moved forward along the elongated opening to tighten against the object when engaged by the cam surface.

3. The anchor device of claim 2, wherein the upper plate and the cam lever are substantially fixed in position along the elongated opening while the moving clamping bracket is moved forward to tighten against the object when engaged by the cam surface.

4. The anchor device of claim 1, wherein the moving clamping assembly further includes an inner moving plate that moves within the elongated opening.

5. The anchor device of claim 1, wherein pivoting the cam lever rotates a threaded bolt that extends through a body of the cam lever, the threaded bolt extending through the elongated opening and received by a threaded passage in a first lower plate on an opposite side of the base.

6. The anchor device of claim 5, wherein the cam lever, first lower plate, and moving clamping bracket are coupled to an inner moving plate that moves within the elongated opening, the inner moving plate including an elongated slot that receives the threaded bolt, the slot having a length that is longer than a radius of the bolt to permit the moving inner moving plate and the moving clamping bracket to move along the elongated opening of the base relative to the bolt, the cam lever, and the first lower plate.

7. The anchor device of claim 1, wherein the moving clamping bracket includes a continuous step along a length of the moving clamping bracket, the step defining a surface that is radially engaged by the cam surface when the cam lever is pivoted to the clamping position.

8. The anchor device of claim 1, including an attachment flange extending axially at an angle from the second end of the base including at least one opening for attaching the anchor device to the ladder.

9. The anchor device of claim 1, wherein pivoting the cam lever between the non-clamping position and the clamping position is less than or equal to about 180°.

10. The anchor device of claim 1, further comprising a tether assembly including a tether, wherein the main body includes an attachment flange at the second end of the base, and wherein the tether is coupled to the attachment flange.

11. The anchor device of claim 10, wherein the tether assembly includes a metal clip for clipping onto an opening of the attachment flange and an adjustable buckle for adjusting a length of the tether.

12. The anchor device of claim 10, wherein the tether is wrapped through an opening of the attachment flange and the tether assembly includes an adjustable buckle for adjusting a length of the tether.

13. The anchor device of claim 10, wherein the attachment flange extends axially at an angle from the second end of the base, and wherein the tether is coupled to the attachment flange via an opening in the attachment flange.

* * * * *